UNITED STATES PATENT OFFICE.

HAROLD HIBBERT, OF PITTSBURGH, PENNSYLVANIA, ASSIGNOR TO UNION CARBIDE COMPANY, OF NEW YORK, N. Y., A CORPORATION OF VIRGINIA.

PROCESS OF MAKING ACETIC ACID.

1,230,899.        Specification of Letters Patent.     Patented June 26, 1917.

No Drawing.     Application filed August 15, 1916. Serial No. 115,062.

*To all whom it may concern:*

Be it known that I, HAROLD HIBBERT, a subject of the King of Great Britain, residing at Pittsburgh, in the county of Allegheny and State of Pennsylvania, have invented certain new and useful Improvements in Processes of Making Acetic Acid, of which the following is a specification.

Acetic acid has heretofore been made by oxidation of acetaldehyde through the agency of oxygen. Various reacting conditions have been proposed, but so far as I am aware the reaction has in all cases been incomplete and relatively slow. For example it has been proposed to lead acetaldehyde and oxygen, in the required proportions, through towers filled with inert materials such as glass, pottery, etc., these inert materials being with advantage preliminarily saturated with glacial acetic acid. Under such conditions the reaction is rather sluggish and there is some liability to explosion.

I have discovered that wood charcoal promotes this specific reaction to an extraordinary degree. Animal charcoal does not produce a like effect.

I prefer to proceed as follows: Wood charcoal in the form of lumps or fragments is charged into a jacketed iron tower having an inner enameled surface. The charcoal may be initially soaked in glacial acetic acid, or this treatment may be omitted, in which case the charcoal becomes saturated with acetic acid as the reaction develops. Oxygen and acetaldehyde, or a suitable gas-mixture containing these bodies, are led into the upper portion of the tower, using preferably a slight excess of oxygen above the reaction requirements. A strong heat development occurs, so that cooling is usually necessary in order to maintain the optimum temperature, which is about 45° C. The acetic acid is continually drawn off from the lower portion of the tower. By proceeding in this way I have been able to secure an oxidation-efficiency well in excess of 90 per cent., the concentration of the acetic acid produced being 70 per cent. and upward.

I claim:—

1. Process of making acetic acid which consists in effecting a reaction between acetaldehyde and oxygen in the presence of wood charcoal.

2. Process of making acetic acid which consists in effecting a reaction between acetaldehyde and oxygen in the presence of wood charcoal preliminarily saturated with strong acetic acid.

In testimony whereof I affix my signature in presence of two witnesses.

HAROLD HIBBERT.

Witnesses:
   MARTHA W. KIRKER,
   A. C. SEYLER.